(12) United States Patent
Kojima

(10) Patent No.: US 10,502,279 B2
(45) Date of Patent: Dec. 10, 2019

(54) ANTI-VIBRATION DEVICE

(71) Applicant: BRIDGESTONE CORPORATION, Chuo-ku, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/753,550

(22) PCT Filed: Aug. 3, 2016

(86) PCT No.: PCT/JP2016/072862
§ 371 (c)(1),
(2) Date: Feb. 20, 2018

(87) PCT Pub. No.: WO2017/033696
PCT Pub. Date: Mar. 2, 2017

(65) Prior Publication Data
US 2018/0238414 A1    Aug. 23, 2018

(30) Foreign Application Priority Data

Aug. 21, 2015  (JP) .................. 2015-164133
Jul. 7, 2016   (JP) .................. 2016-135249

(51) Int. Cl.
*F16F 13/10*    (2006.01)
*F16F 13/26*    (2006.01)
*B60K 5/12*     (2006.01)

(52) U.S. Cl.
CPC ............ *F16F 13/10* (2013.01); *B60K 5/1208* (2013.01); *B60K 5/1283* (2013.01); *F16F 13/26* (2013.01);
(Continued)

(58) Field of Classification Search
CPC .......... F16F 13/10; F16F 13/102; F16F 13/20; F16F 13/26; F16F 13/268;
(Continued)

(56) References Cited

U.S. PATENT DOCUMENTS 5,217,211 A * 6/1993 Ide .................... F16F 13/26
                                                  267/140.13
5,246,212 A * 9/1993 Funahashi ............ F16F 13/26
                                                  180/312
(Continued)

FOREIGN PATENT DOCUMENTS

CN    1702348 A    11/2005
CN    1932329 A    3/2007
(Continued)

OTHER PUBLICATIONS

International Search Report issued in International Application No. PCT/JP2016/072862 dated Sep. 20, 2016.
(Continued)

*Primary Examiner* — Pamela Rodriguez
(74) *Attorney, Agent, or Firm* — Solaris Intellectual Property Group, PLLC

(57) ABSTRACT

An anti-vibration device includes: a cylinder body coupled to a vibration receiver; a support body coupled to a vibration source; an elastic body that attaches the support body to the cylinder body such that the support body is capable of moving relative to the cylinder body; a first liquid chamber sectioned by an orifice pathway and the elastic body; a second liquid chamber that a liquid flows to and from the first liquid chamber through the orifice pathway; a first gas chamber with a wall configured by a diaphragm; a second gas chamber capable of communicating with the first gas
(Continued)

chamber; and a switching section that switches a state of communication of the first gas chamber and the second gas chamber.

6 Claims, 4 Drawing Sheets

(52) U.S. Cl.
CPC . *F16F 2228/066* (2013.01); *F16F 2230/0023* (2013.01)

(58) Field of Classification Search
CPC ........ F16F 2228/066; F16F 2230/0023; B60K 5/1208; B60K 5/1283
USPC ....... 248/562, 636, 638; 267/140.13–140.15, 267/219
See application file for complete search history.

(56) References Cited

U.S. PATENT DOCUMENTS

| | | | |
|---|---|---|---|
| 5,370,375 A * | 12/1994 | Kojima | F16F 13/262 267/140.14 |
| 5,393,041 A | 2/1995 | Takano et al. | |
| 5,437,437 A | 8/1995 | Takano et al. | |
| 5,437,438 A | 8/1995 | Takano et al. | |
| 5,839,720 A * | 11/1998 | Kojima | F16F 13/26 267/140.14 |
| 7,448,605 B2 * | 11/2008 | Bretaudeau | F16F 13/268 267/140.14 |
| 2003/0098533 A1 | 5/2003 | Nishi et al. | |

FOREIGN PATENT DOCUMENTS

| | | |
|---|---|---|
| EP | 0754878 A1 | 1/1997 |
| JP | H05-071573 A | 3/1993 |
| JP | H08-074923 A | 3/1996 |
| JP | H08-277877 A | 10/1996 |
| JP | 2002-357239 A | 12/2002 |
| JP | 2003-148550 A | 5/2003 |
| JP | 2004-301248 A | 10/2004 |
| JP | 2005-76797 A | 3/2005 |
| JP | 2010-255819 A | 11/2010 |

OTHER PUBLICATIONS

Extended European Search Report dated Jul. 30, 2018 issued in corresponding EP Patent Application No. 16839043.3.
Search Report of the Chinese office action dated Feb. 26, 2019, from the SIPO in a Chinese patent application corresponding to the instant patent application.

\* cited by examiner

ANTI-VIBRATION DEVICE

TECHNICAL FIELD

The present disclosure relates to an anti-vibration device that suppresses vibration.

RELATED ART

In vehicles, anti-vibration devices are employed to suppress vibration generated by the engine (see, for example, Japanese Patent Application Laid-Open (JP-A) No. H08-74923).

This anti-vibration device includes a support body that supports the engine, a cylinder body that is coupled to the vehicle body, and an elastic body that couples the support body to the cylinder body. A liquid chamber is formed inside the cylinder body. The liquid chamber is sectioned by a second partitioning wall into a main liquid chamber and a sub liquid chamber, in this sequence from the support body side.

The main liquid chamber and the sub liquid chamber are in communication with each other through a regulating pathway formed in the second partitioning wall. Part of a wall face of the sub liquid chamber is configured by a diaphragm. An air chamber is provided on the other side of the diaphragm to the sub liquid chamber. The air chamber is configured to be capable of being placed in communication with the exterior by a switching valve. The air chamber is capable of switching between a state in communication with the exterior and open to the atmosphere, and a non-open state sealed off from the exterior.

Accordingly, when the elastic body deforms due to vibration from the engine, the diaphragm configuring the wall face of the sub liquid chamber deforms, such that there is an exchange flow of liquid between the main liquid chamber and the sub liquid chamber via the regulating pathway. The static spring constant of the anti-vibration device can be changed by switching the atmosphere-open-state of the air chamber using the switching valve.

SUMMARY OF INVENTION

Technical Problem

However, since the switching valve has hitherto been configured in communication with the exterior of the anti-vibration device, it has been necessary to provide a filter at a portion in communication with the exterior in order to prevent the intrusion of foreign objects or moisture into the switching valve.

An object of an exemplary embodiment of the present invention is to provide an anti-vibration device in which foreign objects or moisture do not readily intrude into a switching section.

Solution to Problem

A first aspect is an anti-vibration device including a cylinder body, a support body, an elastic body, a first liquid chamber, a second liquid chamber, a first gas chamber, a second gas chamber, and a switching section. The cylinder body is coupled to one of a vibration source or a vibration receiver. The support body is coupled to the other of the vibration source or the vibration receiver. The elastic body attaches the support body to the cylinder body such that the support body is capable of moving relative to the cylinder body. The first liquid chamber is provided between the elastic body and a pathway member formed within the cylinder body, and houses a liquid. The second liquid chamber is provided between the pathway member and a diaphragm partitioning an interior of the cylinder body, a liquid flowing between the first liquid chamber and the second liquid chamber through a pathway formed by the pathway member. The first gas chamber is provided on an opposite side of the diaphragm from the second liquid chamber. The second gas chamber is isolated from the first gas chamber. The switching section switches between a state of communication and a state of non-communication between the first gas chamber and the second gas chamber.

Namely, the switching section is configured to place the first gas chamber and the second gas chamber in communication with each other. The intrusion of foreign objects or moisture from the exterior is thereby suppressed, without providing a filter or the like at a portion of the switching section in communication with the exterior, as in a structure in which the first gas chamber is placed in direct communication with the exterior.

In a second aspect, the second gas chamber is only communicable with the first gas chamber.

Namely, the second gas chamber, that communicates with the first gas chamber, is configured to be only communicable with the first gas chamber, thus enabling a closely sealed state of the first gas chamber and the second gas chamber to be maintained even in a state in which the first gas chamber and the second gas chamber are in communication with each other.

This thereby enables the intrusion of foreign objects or moisture into the switching section from the exterior to be suppressed in comparison to cases in which the second gas chamber is open to the atmosphere through small holes.

In a third aspect, a capacity of the second gas chamber is greater than a capacity of the first gas chamber.

Namely, by setting the capacity of the second gas chamber to be greater than that of the first gas chamber, a large change in capacity can be achieved between a state of non-communication between the two gas chambers and a state of communication between the two gas chambers.

Thus increasing the difference between the respective capacities of the gas chambers enables a large change in the static spring constant of the anti-vibration device to be achieved, even within a limited space.

A fourth aspect is an anti-vibration device including a cylinder body, a support body, an elastic body, a first liquid chamber, a first gas chamber, a second liquid chamber, a deformation space, a second gas chamber, and a switching section. The cylinder body is coupled to one of a vibration source or a vibration receiver. The support body is coupled to the other of the vibration source or the vibration receiver. The elastic body attaches the support body to the cylinder body such that the support body is capable of moving relative to the cylinder body. The first liquid chamber is provided between the elastic body and a first membrane partitioning an interior of the cylinder body, and houses a liquid. The first gas chamber is provided between the first membrane and a first partitioning wall of a pathway member partitioning the interior of the cylinder body. The second liquid chamber is provided between the first partitioning wall and a second membrane partitioning the interior of the cylinder body, a liquid flowing between the first liquid chamber and the second liquid chamber through a pathway formed by the pathway member. The deformation space is provided between the second membrane and a second partitioning wall partitioning the interior of the cylinder body, and forms a deformable region where the second membrane deforms. The second gas chamber is isolated from the first gas chamber. The switching section switches between a state of communication and a state of non-communication between the first gas chamber and the second gas chamber.

Namely, the switching section is configured to place the first gas chamber and the second gas chamber in communication with each other. The intrusion of foreign objects or moisture from the exterior is thereby suppressed, without providing a filter or the like at a portion of the switching section in communication with the exterior, as in a structure in which the first gas chamber is placed in direct communication with the exterior.

In a fifth aspect, the first gas chamber is in communication with the second gas chamber through the deformation space, and the switching section switches a state of communication between the first gas chamber and the second gas chamber through the deformation space.

This thereby enables efficient utilization of the deformation space of the second membrane.

In a sixth aspect, a capacity of the second gas chamber is greater than a capacity of the deformation space, and the capacity of the deformation space is greater than a capacity of the first gas chamber.

Namely, by setting the capacity of the second gas chamber to be greater than that of the first gas chamber, the capacity can be changed largely between a state of non-communication between the two gas chambers and a state of communication between the two gas chambers.

Thus increasing the difference between the respective capacities enables the static spring constant of the anti-vibration device to be changed largely, even within a limited space.

Moreover, the capacity of the first gas chamber is smaller than the capacities of the deformation space and of the second gas chamber. This thereby enables deformation of the first membrane to be suppressed when in the state of non-communication.

Advantageous Effects of Invention

The aspects configured as described above achieve an anti-vibration device in which foreign objects or moisture do not readily intrude into a switching section.

DESCRIPTION OF EMBODIMENTS

First Exemplary Embodiment

Explanation follows regarding a first exemplary embodiment of the present invention, with reference to the drawings.

Figure 1:
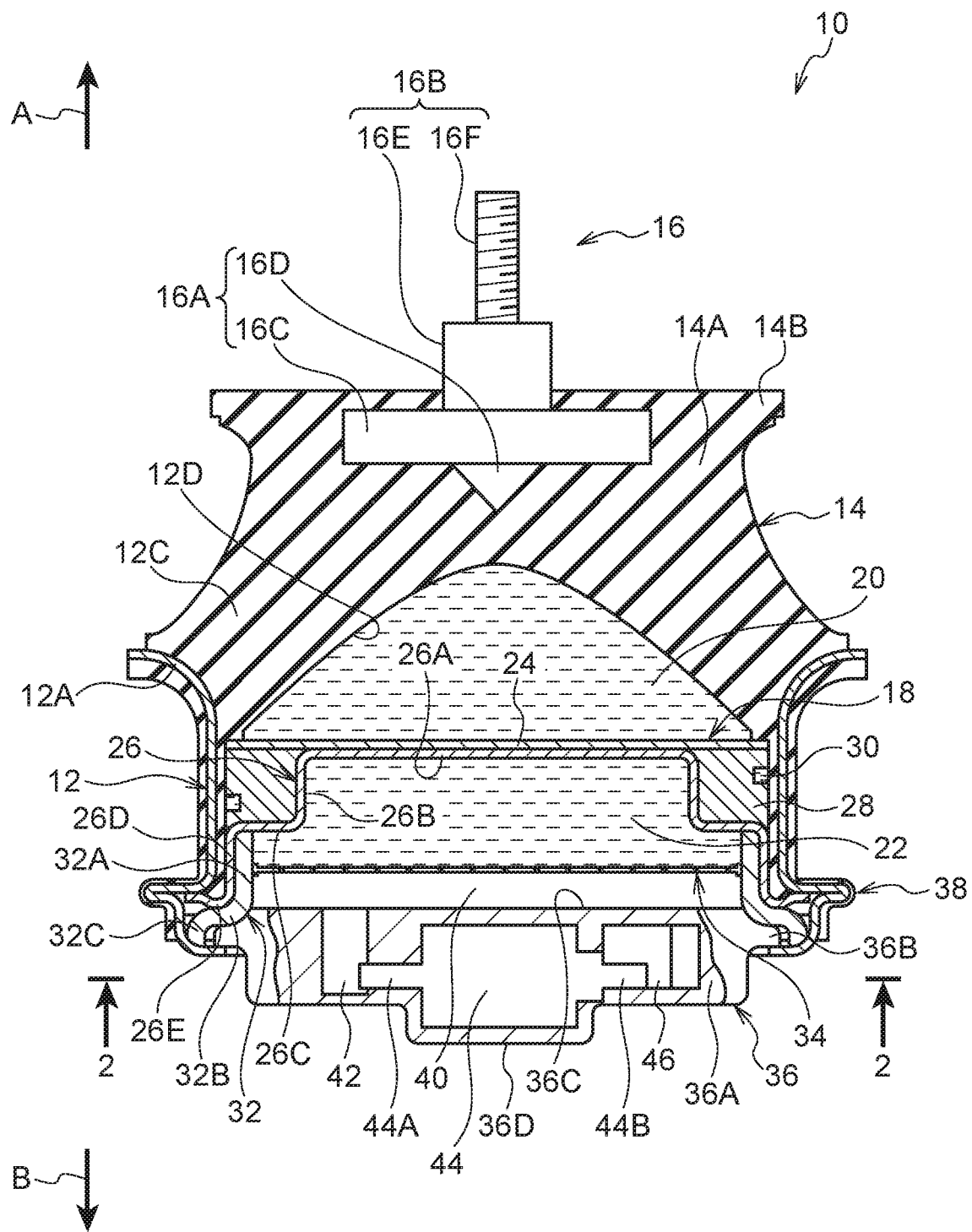
FIG. 1 is a longitudinal cross-section illustrating an anti-vibration device according to a first exemplary embodiment.

FIG. 1 is a diagram illustrating an anti-vibration device 10 according to the present exemplary embodiment. The anti-vibration device 10 is attached to a vehicle, and is used to suppress vibration from an engine.

The anti-vibration device 10 includes a cylinder body 12 that is coupled to a vehicle body, serving as an example of a vibration receiver. An opening edge of an opening at an end portion on one direction A side of the cylinder body 12 is curved toward a radial direction outer side, forming a curved portion 12A around the entire periphery of the cylinder body 12.

An elastic body 14 made from rubber is bonded to the curved portion 12A of the cylinder body 12. The opening on the one direction A side of the cylinder body 12 is closed off by the elastic body 14.

The elastic body 14 includes a main body 14A that is formed in a circular column shape. A sideways-extending flange 14B is integrally formed around the entire circumference of the main body 14A at one end portion of the main body 14A. A leg section 12C is integrally formed to the main body 14A so as to extend toward the curved portion 12A of the cylinder body 12. An end face of the leg section 12C is vulcanization-bonded to an inner peripheral face of the curved portion 12A of the cylinder body 12.

The leg section 12C is inclined toward an outer peripheral direction on progression toward a cylinder body 12 side. The elastic body 14 is formed with a peaked shape that becomes higher on progression toward a central portion. An inner face 12D of the leg section 12C is inclined so as to become higher on progression toward the central portion, forming an inverted conical bowl-shaped space inside the elastic body 14.

A metal support body 16 is provided at the main body 14A of the elastic body 14. The support body 16 is provided with an embedded portion 16A that is embedded in the main body 14A, and an extension section 16B extending out from the embedded portion 16A. The extension section 16B is configured so as to extend beyond an end face of the main body 14A. The embedded portion 16A is configured by a circular plate shaped anchor 16C, and a triangular pyramidal projection 16D projecting from the anchor 16C toward the cylinder body 12 side. The anchor 16C suppresses the support body 16 from being pulled out from the elastic body 14.

The extension section 16B is configured by a circular column shaped large diameter portion 16E extending from the anchor 16C, and a threaded portion 16F extending from the large diameter portion 16E. The threaded portion 16F is configured to support an engine, this being an example of a vibration source. The elastic body 14 elastically deforms when input with vibration from the engine, so as to allow the support body 16 to move relative to the cylinder body 12.

A partitioning member 18 is provided inside the cylinder body 12. A first liquid chamber 20, filled with a liquid such as ethylene glycol, is formed between the partitioning member 18 and the elastic body 14. A second liquid chamber 22 is formed on the opposite side of the partitioning member 18 from the first liquid chamber 20.

The partitioning member 18 includes a circular plate 24, formed from a circular plate material, and a support plate 26 that supports the circular plate 24. The support plate 26 is fixed in a state in which an upper face of a circular top face 26A configuring a central portion of the support plate 26 is in face-to-face contact with the circular plate 24, while a lower face of the top face 26A faces the second liquid chamber 22. An outer peripheral portion of the top face 26A is bent toward another direction B side to form a small diameter cylinder wall 26B. An end portion of the small diameter cylinder wall 26B is bent outward to form a step 26C. An outer peripheral portion of the step 26C is bent toward the other direction B side to form a large diameter cylinder wall 26D. An end portion of the large diameter cylinder wall 26D is bent outward, and a fixing flange 26E is formed around the entire circumference of the large diameter cylinder wall 26D.

A circular ring-shaped pathway formation member 28 is provided at the step 26C. The pathway formation member 28 is retained on the partitioning member 18 in a state held between the step 26C of the support plate 26, and the circular plate 24. An outer peripheral face of the pathway formation member 28 is formed with a helical groove, and an orifice pathway 30 is configured between the groove and the cylinder body 12. One end of the orifice pathway 30 is in communication with the first liquid chamber 20 through a hole, not illustrated in the drawings, provided in the circular plate 24, and the other end of the orifice pathway 30 is in communication with the second liquid chamber 22 through a hole, not illustrated in the drawings, provided in the step 26C.

The first liquid chamber 20 and the second liquid chamber 22 are placed in communication with each other by the orifice pathway 30. The orifice pathway 30 is configured to enable an exchange flow of liquid between the first liquid chamber 20 and the second liquid chamber 22, and to limit the flow rate.

An insertion-fitting member 32 is fixed to the large diameter cylinder wall 26D of the support plate 26. The insertion-fitting member 32 is configured by an inner fitting cylinder 32A that fits into the large diameter cylinder wall 26D, and a flange 32B bent outward from an end of the inner fitting cylinder 32A. At a circumferential rim of the flange 32B there is an inflected portion 32C formed around the entire circumference so as to be inflected toward the other direction B side.

A circumferential rim of a diaphragm 34 made from rubber is vulcanization-bonded to an inside of the inner fitting cylinder 32A. The second liquid chamber 22 is thus sectioned by the diaphragm 34 and the top face 26A side of the support plate 26.

A bottom-section configuration member 36 is provided further to the other direction B side than the diaphragm 34. The bottom-section configuration member 36 forms a wall face 36D that closes off an opening on the other direction B side of the cylinder body 12, thereby sealing the internal space of the cylinder body 12.

The bottom-section configuration member 36 is configured by a circular column 36A, and a fixing portion 36B projecting outward from a circumferential face of the circular column 36A. The fixing portion 36B is surrounded by the inflected portion 32C in a state in which the fixing portion 36B is in face-to-face contact with the flange 32B of the insertion-fitting member 32. The fixing portion 36B of the bottom-section configuration member 36, the flange 32B of the insertion-fitting member 32, and the fixing flange 26E of the support plate 26 are fixed by crimping an edge of the cylinder body 12 at a crimped portion 38.

An upper end face of the bottom-section configuration member 36 configures a dividing wall 36C sectioning the internal space of the cylinder body 12. An air-filled first gas chamber 40 is thus formed between the dividing wall 36C and the diaphragm 34. The first gas chamber 40 is disposed on the opposite side of a wall configured by the diaphragm 34 from the second liquid chamber 22.

A circular column shaped first communication pathway 42 that is in communication with the first gas chamber 40 is opened in the dividing wall 36C configured by the bottom-section configuration member 36. A first port 44A of a switching section 44 built into the bottom-section configuration member 36 is connected to the first communication pathway 42. A second port 44B on the opposite side of the switching section 44 from the first port 44A is in communication with a second gas chamber 46 formed in the bottom-section configuration member 36.

Figure 2:
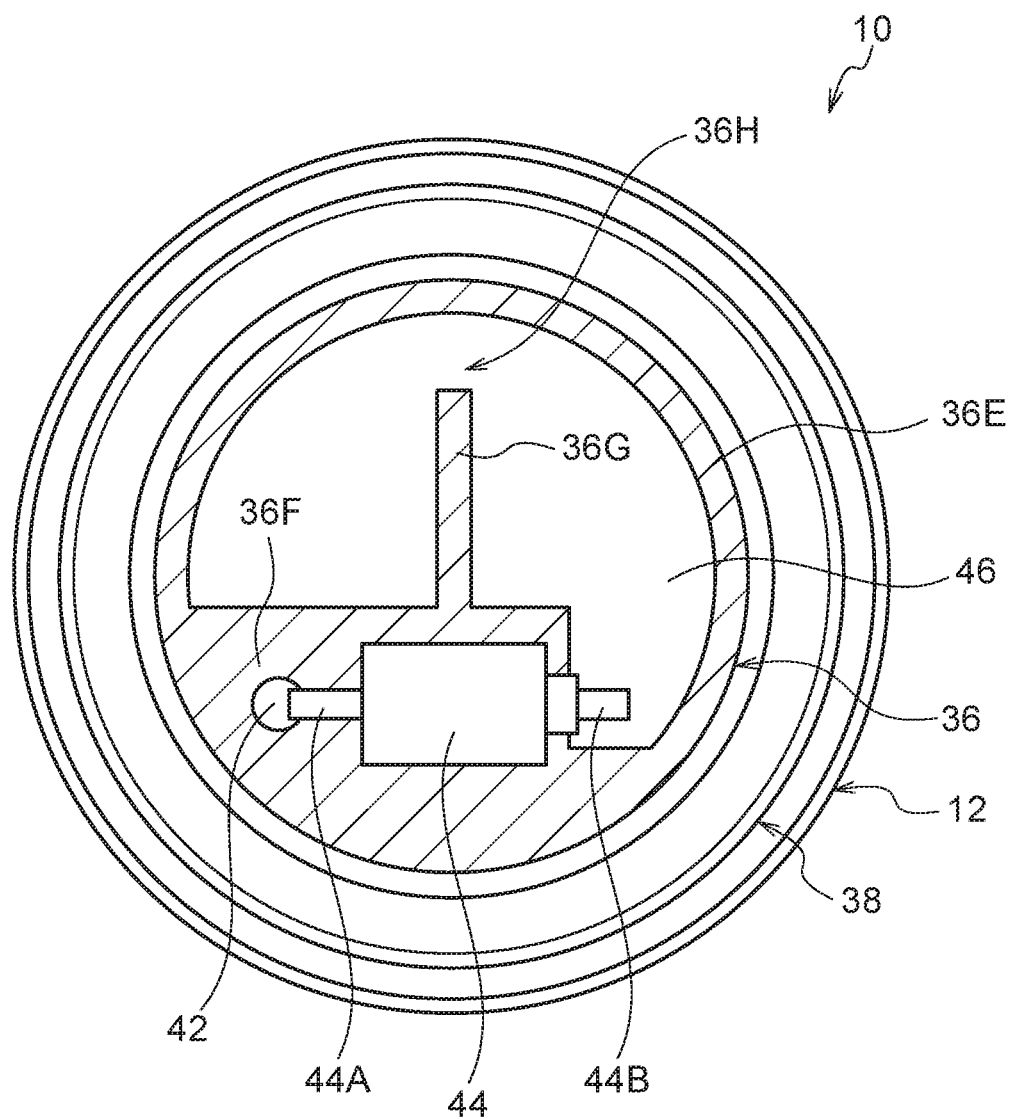
FIG. 2 is cross-section illustrating an anti-vibration device according to the first exemplary embodiment, as viewed along the arrows 2-2 in FIG. 1.

As illustrated in FIG. 2, a thin walled portion 36E configures an outer peripheral wall at the bottom-section configuration member 36, and the second gas chamber 46 is configured by a large cavity provided at an inside of the thin walled portion 36E. The switching section 44 is provided at a jutting out portion 36F formed such that the jutting out portion 36F juts out from a portion of the thin walled portion 36E toward the inside. The second gas chamber 46 is formed substantially in a fan-shape circumventing the jutting out portion 36F provided with the switching section 44. A region of the bottom-section configuration member 36 excluding the jutting out portion 36F is efficiently utilized as the second gas chamber 46. Thus approximately one third of the interior of the bottom-section configuration member 36 is set to configure the jutting out portion 36F, and approximately two thirds of the interior of the bottom-section configuration member 36 is set to configure the second gas chamber 46.

A skeleton wall 36G is provided extending outward through a central portion of the fan shape of the second gas chamber 46. The skeleton wall 36G is disposed at a position bisecting the second gas chamber 46. The skeleton wall 36G supports a top face of the second gas chamber 46 on a bottom face of the second gas chamber 46, and maintains a separation distance between the top face and the bottom face, thereby providing structural reinforcement to the second gas chamber 46.

A gap is provided between a leading end of the skeleton wall 36G and the thin walled portion 36E, so as to form a pathway 36H. A region provided with the second port 44B of the switching section 44 is formed on one side and another region is formed on the other side of the skeleton wall 36G as a boundary, and the both regions are in communication with each other through the pathway 36H. This provides structural reinforcement to the second gas chamber 46 while securing the overall capacity of the second gas chamber 46. A path from the one side to the other side of the second gas chamber 46 is configured so as to be inflected.

A height dimension of the second gas chamber 46 is set larger than that of the first gas chamber 40. The capacity of the second gas chamber 46 is therefore greater than the capacity of the first gas chamber 40.

Note that although in the present exemplary embodiment explanation is given regarding a case in which the capacity of the second gas chamber 46 is greater than the capacity of the first gas chamber 40, there is no limitation thereto. The capacity of the second gas chamber 46 and the capacity of the first gas chamber 40 may be the same as each other, or the capacity of the second gas chamber 46 may be smaller than the capacity of the first gas chamber 40.

As illustrated in FIG. 1, the second gas chamber 46 is provided at a position separated from the diaphragm 34 by the dividing wall 36C configured by the bottom-section configuration member 36. The diaphragm 34 does not configure a wall of the second gas chamber 46. Accordingly, even when the pressure inside the second liquid chamber 22 changes so as to displace the diaphragm 34, the second gas chamber 46 does not influence the pressure change inside the second liquid chamber 22 so long as the second gas chamber 46 and the first gas chamber 40 are in a state of non-communication.

In this example, the switching section 44 is configured by a solenoid valve. Only a terminal of the solenoid valve that is connected to a control harness extends to the exterior (not illustrated in the drawings). The solenoid valve configuring the switching section 44 is thus kept airtight and watertight, thereby preventing the intrusion of water or foreign objects from the exterior.

The solenoid valve configuring the switching section 44 controls an air flow between the first port 44A and the second port 44B. Specifically, when the solenoid valve is operated, an air flow between the first port 44A and the second port 44B is permitted, thereby forming a state of communication in which the first gas chamber 40 and the second gas chamber 46 are in communication with each other. When the solenoid valve is not operated, the air flow between the first port 44A and the second port 44B is cut off, forming a state of non-communication in which the first gas chamber 40 and the second gas chamber 46 are not in communication with each other.

The switching section 44 is thus configured capable of placing the first port 44A and the second port 44B in communication with each other, and the switching section 44 is capable of placing the first gas chamber 40, which is in communication with the first port 44A through the first communication pathway 42, in communication with the second gas chamber 46, which is in communication with the second port 44B.

The switching section 44 is provided with a housing space that houses the workings of the solenoid valve, such as a solenoid, a plunger, and a valve body (not illustrated in the drawings). Taking the first gas chamber 40 as being on an upstream side, the switching section 44 is connected to the second gas chamber 46 downstream of the housing space such that the switching section 44 is capable of placing the first gas chamber 40, which is on the upstream side of the housing space, in communication with the second gas chamber 46, which is on the downstream side of the housing space.

The second gas chamber 46 is configured to be only communicable with the first gas chamber 40, and is sealed elsewhere to prevent any communication except that with the first gas chamber 40.

Explanation follows regarding operation of the present exemplary embodiment configured as described above. When vibration is received from the engine and relative movement occurs between cylinder body 12 and the support body 16, the elastic body 14 deforms, changing the liquid pressure inside the first liquid chamber 20. When this occurs, liquid moves between the first liquid chamber 20 and the second liquid chamber 22 via the orifice pathway 30, thereby changing the liquid pressure in the second liquid chamber 22, and displacing the diaphragm 34 in accordance with this change in the liquid pressure.

When this occurs, the displacement amount of the diaphragm 34 varies according to spring force of an air spring in the first gas chamber 40.

Accordingly, the state of non-communication, in which the first gas chamber 40 and the second gas chamber 46 are not in communication with each other, is changed by the switching section 44 to the state of communication. This increases the total capacity of gas chamber having a wall face configured by the diaphragm 34. This enables the static spring constant of the anti-vibration device 10 to be changed from a high spring constant to a low spring constant.

When this occurs, the switching section 44 communicates with the second gas chamber 46. This enables the intrusion of foreign objects or moisture from the exterior to be suppressed, without providing a filter or the like at a portion of the switching section 44 establishing communication with the exterior, as would be the case were the first gas chamber 40 to be placed in direct communication with the exterior. This thereby enables rusting or shorting caused by moisture intrusion to be suppressed.

Moreover, the switching section 44 is built into the bottom-section configuration member 36 so as to be kept airtight and watertight. This thereby enables the direct intrusion of foreign objects or moisture into the switching section 44 to be suppressed in comparison to cases in which the switching section 44 is provided at the exterior of the anti-vibration device 10. This enables the aforementioned advantageous effect to be enhanced.

The second gas chamber 46 is only communicable with the first gas chamber 40, and is sealed so as to prevent any other communication other than that with the first gas chamber 40.

Moreover, the second gas chamber 46 is sealed so as to prevent any communication other than that with the first gas chamber 40, thus enabling a closely sealed state to be maintained even in a state in which the first gas chamber 40 and the second gas chamber 46 are in communication with each other. This thereby enables the intrusion of foreign objects or moisture into the switching section 44 from the exterior to be suppressed in comparison to cases in which the first gas chamber 40 is in communication with the exterior, without providing a filter or the like at a communication portion.

Moreover, the intrusion of foreign objects or moisture from the exterior can be suppressed in comparison to cases in which the second gas chamber 46 is configured open to the atmosphere by the provision of small holes.

The anti-vibration device 10 is thereby achieved in which foreign objects or moisture do not readily intrude into the switching section 44 in.

The capacity of the second gas chamber 46 is set to be greater than the capacity of the first gas chamber 40, enabling a larger change in capacity between the state of non-communication between the first gas chamber 40 and the second gas chamber 46, and the state of communication.

Accordingly, even with the limited space available inside the device, a large change in the static spring constant of the anti-vibration device 10 can be achieved by making a large difference between the capacity occupied by the first gas chamber 40 and the capacity occupied by the second gas chamber 46.

Note that although in the present exemplary embodiment, explanation has been given regarding an example in which the second gas chamber 46 is only communicable with the first gas chamber 40, there is no limitation thereto. For example, small holes that place the second gas chamber 46 in communication with the exterior may be formed penetrating a bottom face of the circular column 36A. So long as such small holes are holes capable of preventing the intrusion of solid foreign objects, blockages can be prevented. Accordingly, placing the switching section 44 in the state of communication allows the first gas chamber 40 to approach a state open to the atmosphere, enabling an even greater change in the static spring constant of the anti-vibration device 10 to be achieved.

In such cases, the intrusion of foreign objects or moisture into the switching section 44 can be suppressed by providing small holes at a location separated from the second port 44B. Here, in the present exemplary embodiment, the skeleton wall 36G is provided in the second gas chamber 46, and the path from the one side to the other side of the second gas chamber 46 is configured so as to be inflected. This thereby enables the advantageous effect of enhancing the prevention of foreign objects or moisture intruding. Moreover, provision of a filter to any small holes provided would enable the intrusion of foreign objects or moisture to be suppressed.

Moreover, although in the present exemplary embodiment, explanation has been given regarding a case in which a wall face of the second gas chamber 46 is configured by the bottom-section configuration member 36, there is no limitation thereto. For example, configuring part of the wall face of the second gas chamber 46 with a diaphragm facing the exterior enables the first gas chamber 40 to more closely approach a state open to the atmosphere when the switching section 44 has set the state of communication. Moreover, the second gas chamber 46 may be provided away from the anti-vibration device 10 so long as the state of communication with the first gas chamber 40 can be achieved.

Second Exemplary Embodiment

Figure 3:
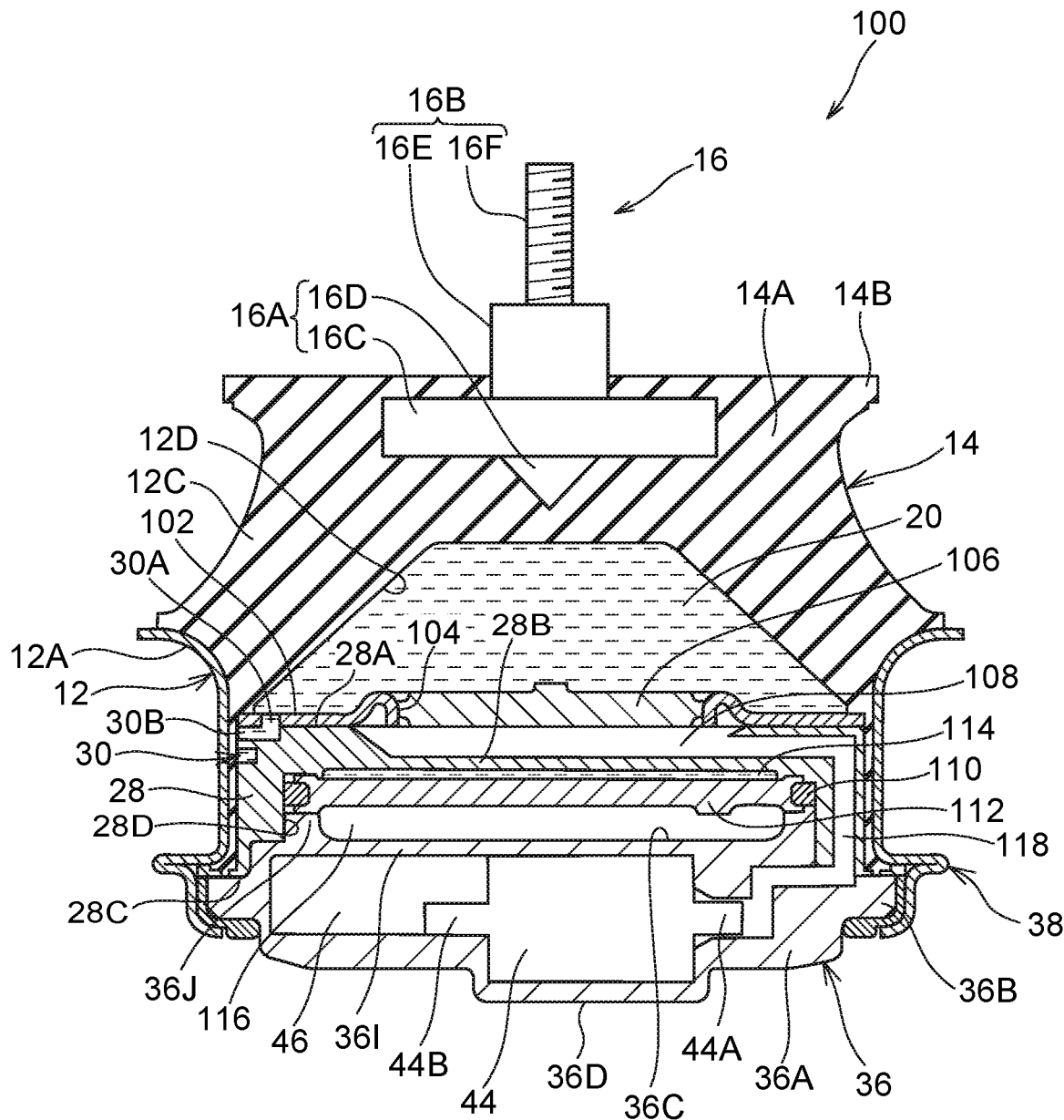
FIG. 3 is a longitudinal cross-section illustrating an anti-vibration device according to a second exemplary embodiment.

FIG. 3 is a diagram illustrating an anti-vibration device 100 according to a second exemplary embodiment. Portions that are the same as or equivalent to those of the first exemplary embodiment are allocated the same reference numerals, and explanation thereof is omitted. Explanation covers only portions that differ from the first exemplary embodiment.

Namely, a partitioning plate 102 is provided inside the cylinder body 12 on the elastic body 14 side. A central hole 104 is provided at a central portion of the partitioning plate 102. The central hole 104 is provided with a circular plate shaped first membrane 106 made from rubber. A circumferential edge of the first membrane 106 is vulcanization-bonded to an opening edge of the central hole 104. The interior of the cylinder body 12 is thereby partitioned by the first membrane 106.

The cylinder body 12 is provided with the pathway formation member 28, serving as an example of a pathway member that in face-to-face contacts with the partitioning plate 102. A recess is formed in one face 28A of the pathway formation member 28 at a location corresponding to the first membrane 106, and a first gas chamber 108 is formed between a first partitioning wall 28B formed on the bottom face of the recess and the first membrane 106.

A recess 28D is formed in another face 28C of the pathway formation member 28. A circular plate shaped second membrane 112 made from rubber and supported by a ring member 110 is provided at a bottom side, i.e. the elastic body 14 side, of the recess 28D. The interior of the cylinder body 12 is partitioned by the second membrane 112. A wall face at further toward the bottom side of the recess 28D than the fixing position of the second membrane 112 is set back at locations corresponding to the second membrane 112. A second liquid chamber 114 is formed between the second membrane 112 and the first partitioning wall 28B. The second liquid chamber 114 is in communication with the first liquid chamber 20 through the orifice pathway 30, this being an example of a pathway formed in the pathway formation member 28, in a configuration such that there is a flow of liquid between the first liquid chamber 20 and the second liquid chamber 114.

The orifice pathway 30 is configured by a pathway opening 30A formed at the partitioning plate 102, a groove 30B formed in a helical shape around a circumferential face of the pathway formation member 28, and a communication hole (not illustrated in the drawings) placing the groove 30B in communication with the second liquid chamber 114.

A thick walled portion 36J formed at a central portion of the bottom-section configuration member 36 is fitted into the recess 28D of the pathway formation member 28. A recess is formed at an end face of the thick walled portion 36J at locations corresponding to the second membrane 112. A deformation space 116 forming a deformable region of the second membrane 112 is formed between a second partitioning wall 36I at the bottom of the recess and the second membrane 112.

The bottom-section configuration member 36 is provided with the second gas chamber 46 and the switching section 44 described above. The first port 44A of the switching section 44 is in communication with the first gas chamber 108 through a communication pathway 118 provided at the bottom-section configuration member 36 and the pathway formation member 28.

The capacity of the second gas chamber 46 may be set to be greater than the capacity of the deformation space 116, and the capacity of the deformation space 116 may be set to be greater than the capacity of the first gas chamber 108.

The present exemplary embodiment configured as described above is capable of exhibiting similar operation and advantageous effects to those of the first exemplary embodiment.

When a change in the pressure in the first liquid chamber 20 occurs when vibration is input, the first membrane 106 elastically deforms toward the first gas chamber 108 side, thereby enabling the vibration absorption performance to be enhanced. When this occurs, the state of communication between the first gas chamber 108 and the second gas chamber 46 is switched by the switching section 44, enabling the dynamic spring constant due to the first liquid chamber 20 to be changed.

This thereby enables the capacity between the state of communication, in which the first gas chamber 108 and the second gas chamber 46 are in communication with each other, and the state of non-communication, to be changed relatively great. The static spring constant and the dynamic spring constant of the anti-vibration device 100 can thereby be changed largely.

Moreover, the capacity of the first gas chamber 108 is smaller than the capacities of the deformation space 116 and the second gas chamber 46. This thereby enables deformation of the first membrane 106 when in the state of non-communication to be suppressed.

Third Exemplary Embodiment

Figure 4:
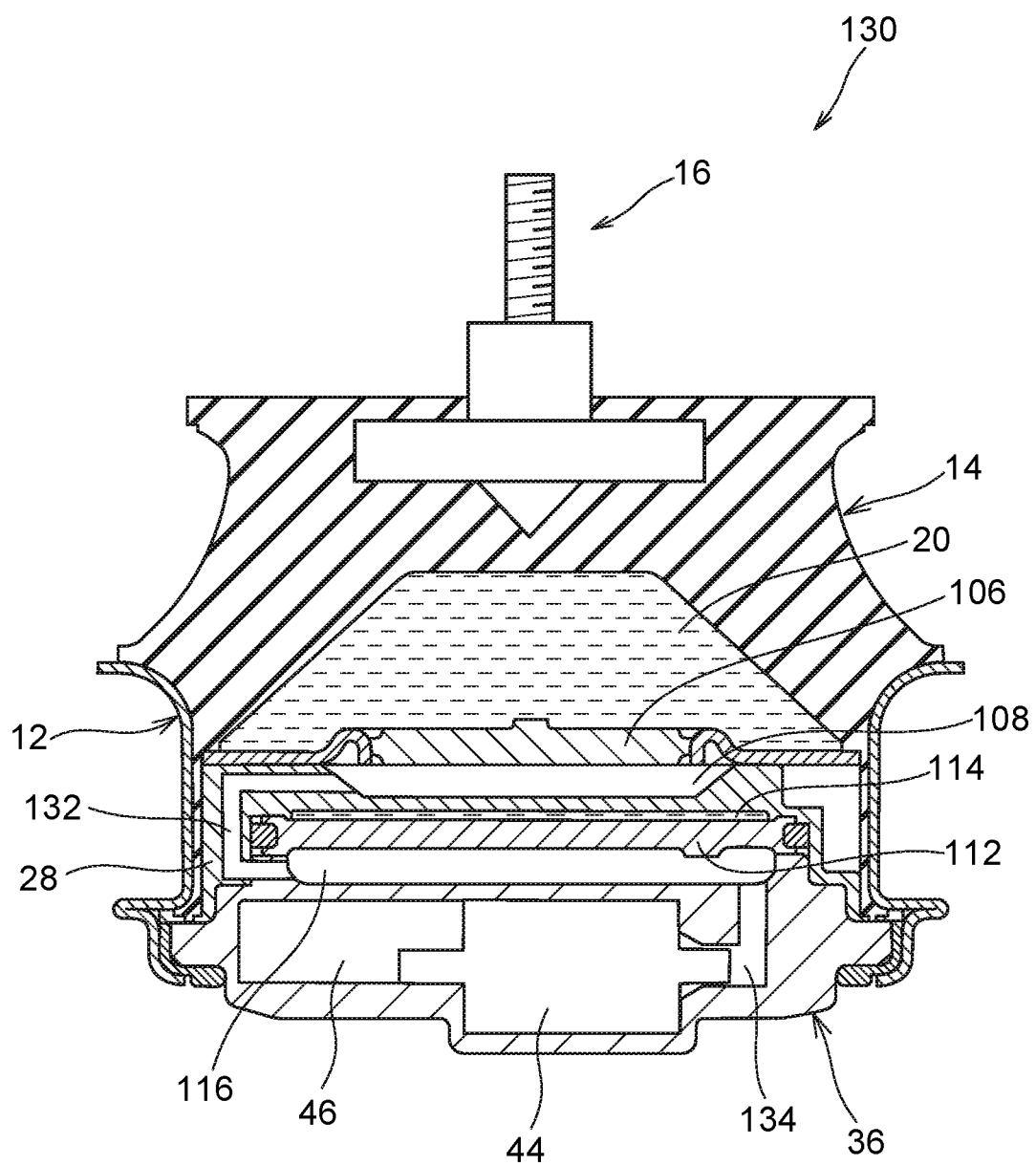
FIG. 4 is a longitudinal cross-section illustrating an anti-vibration device according to a third exemplary embodiment.

FIG. 4 is a diagram illustrating an anti-vibration device 130 according to a third exemplary embodiment. Portions that are the same as or equivalent to those of the first and second exemplary embodiments are allocated the same reference numerals, and explanation thereof is omitted. Explanation covers only portions that differ from the first and second exemplary embodiments.

Namely, the anti-vibration device 130 of the present exemplary embodiment differs from the second exemplary embodiment in the point that the first gas chamber 108 is placed in communication with the second gas chamber 46 through the deformation space 116. Specifically, a first communication pathway 132 is formed in the pathway formation member 28 so as to place the first gas chamber 108 and the deformation space 116 in communication with each other. Moreover, a second communication pathway 134 is formed in the bottom-section configuration member 36 so as to place the deformation space 116 and the second gas chamber 46 in communication with each other through the switching section 44. The switching section 44 is thus configured so as to switch a state of communication between the first gas chamber 108 and the second gas chamber 46 through the deformation space 116.

This configuration enables the deformation space 116 at the second membrane 112 provided between the first gas chamber 108 and the second gas chamber 46 to be efficiently utilized as a communication pathway placing the first gas chamber 108 and the second gas chamber 46 in communication with each other.

Moreover, the first gas chamber 108 and the deformation space 116 are in communication with each other even when the switching section 44 is set to the state of non-communication. The combined capacity of the first gas chamber 108 and the deformation space 116 is thus greater than that of the first gas chamber 108 alone. This thereby enables a softening to be achieved in static spring and dynamic spring.

Note that similar operation and advantageous effects to those of the first exemplary embodiment are obtained when the deformation space 116 that is adjacent to the second liquid chamber 114 is placed in communication with the second gas chamber 46 by the switching section 44. Moreover, the present exemplary embodiment is capable of exhibiting similar operation and advantageous effects to those of the first exemplary embodiment.

Note that in each of the exemplary embodiments, explanation has been given regarding cases in which the support body 16 is fixed to the engine side, this being an example of a vibration source, and the cylinder body 12 is coupled to the vehicle body, this being an example of a vibration receiver. However, there is no limitation thereto. Configuration may be made in which the cylinder body 12 is fixed to the side of the engine, which is an example of a vibration source, and the support body 16 is coupled to the side of the vehicle body, which is an example of a vibration receiver.

The disclosure of Japanese Patent Application No. 2015-164133, filed on Aug. 21, 2015, and the disclosure of Japanese Patent Application No. 2016-135249, filed on Jul. 7, 2016, are incorporated in their entireties by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An anti-vibration device comprising:
a cylinder body coupled to one of a vibration source or a vibration receiver;
a support body coupled to the other of the vibration source or the vibration receiver;
an elastic body attaching the support body to the cylinder body such that the support body is capable of moving relative to the cylinder body;
a first liquid chamber housing a liquid and provided between the elastic body and a pathway member that is formed within the cylinder body;
a second liquid chamber provided between the pathway member and a diaphragm that partitions an interior of the cylinder body, a liquid flowing between the first liquid chamber and the second liquid chamber through a pathway that is formed by the pathway member;
a first gas chamber provided on an opposite side of the diaphragm from the second liquid chamber;
a second gas chamber isolated from the first gas chamber; and
a switching section switching between a state of communication and a state of non-communication between the first gas chamber and the second gas chamber,
wherein the diaphragm does not configure a wall of the second gas chamber, and the second gas chamber is only communicable with the first gas chamber.

2. The anti-vibration device of claim 1, wherein a capacity of the second gas chamber is greater than a capacity of the first gas chamber.

3. An anti-vibration device comprising:
a cylinder body coupled to one of a vibration source or a vibration receiver;
a support body coupled to the other of the vibration source or the vibration receiver;
an elastic body attaching the support body to the cylinder body such that the support body is capable of moving relative to the cylinder body;
a first liquid chamber housing a liquid and provided between the elastic body and a first membrane that partitions an interior of the cylinder body;
a first gas chamber provided between the first membrane and a first partitioning wall of a pathway member that partitions the interior of the cylinder body;
a second liquid chamber provided between the first partitioning wall and a second membrane that partitions the interior of the cylinder body, a liquid flowing between the first liquid chamber and the second liquid chamber through a pathway formed by the pathway member;
a deformation space provided between the second membrane and a second partitioning wall that partitions the interior of the cylinder body, the deformation space forming a deformable region where the second membrane deforms;
a second gas chamber isolated from the first gas chamber; and
a switching section switching between a state of communication and a state of non-communication between the first gas chamber and the second gas chamber,
wherein the second membrane does not configure a wall of the second gas chamber.

4. The anti-vibration device of claim 3, wherein:
the first gas chamber is in communication with the second gas chamber through the deformation space; and
the switching section switches between the state of communication and the state of non-communication between the first gas chamber and the second gas chamber through the deformation space.

5. The anti-vibration device of claim 3, wherein a capacity of the second gas chamber is greater than a capacity of the deformation space, and the capacity of the deformation space is greater than a capacity of the first gas chamber.

6. The anti-vibration device of claim 4, wherein a capacity of the second gas chamber is greater than a capacity of the deformation space, and the capacity of the deformation space is greater than a capacity of the first gas chamber.

* * * * *